United States Patent
Giordano et al.

(10) Patent No.: US 10,337,386 B2
(45) Date of Patent: Jul. 2, 2019

(54) METHOD OF TESTING A PROPER FUNCTIONING OF A SELECTIVE CATALYTIC REDUCTION SYSTEM

(71) Applicant: GM GLOBAL TECHNOLOGY OPERATIONS LLC, Detroit, MI (US)

(72) Inventors: Alberto Giordano, Robilante (IT); Luis Daniel Guerrero Cruz, Turin (IT); Mariano Nocereto, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 436 days.

(21) Appl. No.: 15/287,094

(22) Filed: Oct. 6, 2016

(65) Prior Publication Data

US 2017/0096927 A1      Apr. 6, 2017

(30) Foreign Application Priority Data

Oct. 6, 2015  (GB) .................................. 1517625.8

(51) Int. Cl.
*F01N 11/00* (2006.01)
*F01N 3/20* (2006.01)
(Continued)

(52) U.S. Cl.
CPC ........ *F01N 11/007* (2013.01); *B01D 53/9431* (2013.01); *B01D 53/9495* (2013.01);
(Continued)

(58) Field of Classification Search
CPC ........ B01D 2251/2067; B01D 53/9431; B01D 53/9495; F01N 11/00; F01N 11/007;
(Continued)

(56) References Cited

U.S. PATENT DOCUMENTS

| 8,161,808 | B2 * | 4/2012 | Crawford | ................ | F01N 3/208 |
| | | | | | 73/114.75 |
| 8,484,949 | B2 | 7/2013 | Sebestyen et al. | | |

(Continued)

OTHER PUBLICATIONS

Great Britain Patent Office, Great Britain Combined Search and Examination Report for Great Britain Application No. 1517625.8, dated Dec. 7, 2015.

*Primary Examiner* — Thai Ba Trieu
*Assistant Examiner* — Diem T Tran
(74) *Attorney, Agent, or Firm* — Lorenz & Kopf LLP

(57) ABSTRACT

A method and system is disclosed to test for a proper functioning of a selective catalytic reduction system of an internal combustion engine. The engine is operated at idle speed and a functionality check of the pressure sensor is executed. The engine is operated to increase an exhaust gas temperature in the exhaust pipe upstream of the catalyst and a functionality check of the pump is executed. A functionality check of the injector is executed after the functionality check of the pump and once the exhaust gas temperature has reached a predetermined target value thereof. A functionality check of the supply conduit is executed after the functionality check of the injector. The selective catalytic reduction system is identified as functioning properly when all of the functionality checks yields a positive result or malfunctioning when any one of the functionality checks yields a negative result.

11 Claims, 3 Drawing Sheets

(51) Int. Cl.
  *B01D 53/94* (2006.01)
  *F01N 3/08* (2006.01)
(52) U.S. Cl.
  CPC .......... *F01N 3/0814* (2013.01); *F01N 3/208* (2013.01); *F01N 3/2066* (2013.01); *F01N 11/00* (2013.01); *B01D 2251/2067* (2013.01); *F01N 2550/02* (2013.01); *F01N 2550/05* (2013.01); *F01N 2550/22* (2013.01); *F01N 2570/14* (2013.01); *F01N 2610/02* (2013.01); *F01N 2900/0416* (2013.01); *F01N 2900/1402* (2013.01); *F01N 2900/1808* (2013.01); *F01N 2900/1822* (2013.01); *Y02T 10/24* (2013.01); *Y02T 10/47* (2013.01)
(58) Field of Classification Search
  CPC ............ F01N 2550/02; F01N 2550/05; F01N 2550/22; F01N 2570/14; F01N 2610/02; F01N 2900/0416; F01N 2900/1402; F01N 2900/1808; F01N 2900/1822; F01N 3/0814; F01N 3/2066; F01N 3/208; Y02T 10/24; Y02T 10/47
  See application file for complete search history.

(56) References Cited

U.S. PATENT DOCUMENTS

| | | | |
|---|---|---|---|
| 2009/0159132 A1 | 6/2009 | Gerlach | |
| 2010/0005871 A1* | 1/2010 | Kitazawa | F01N 3/206 73/114.69 |
| 2010/0071349 A1* | 3/2010 | Kitazawa | F01N 3/2066 60/277 |
| 2010/0083636 A1* | 4/2010 | Wang | F01N 3/2066 60/277 |
| 2012/0126989 A1* | 5/2012 | Vernassa | F01N 3/208 340/606 |
| 2013/0283771 A1* | 10/2013 | Nagata | F01N 3/2066 60/282 |
| 2014/0053535 A1 | 2/2014 | Dyrbusch et al. | |
| 2014/0150405 A1* | 6/2014 | Johnson | F01N 3/2073 60/274 |

* cited by examiner

METHOD OF TESTING A PROPER FUNCTIONING OF A SELECTIVE CATALYTIC REDUCTION SYSTEM

CROSS-REFERENCE TO RELATED APPLICATION

This application claims priority to Great Britain Patent Application No. 151.7625.8, filed Oct. 6, 2015, which is incorporated herein by reference in its entirety.

TECHNICAL FIELD

The present disclosure pertains to a method of testing a proper functioning of a selective catalytic reduction (SCR) system of an internal combustion engine, in particular of an internal combustion engine (e.g. gasoline engine or Diesel engine) of a motor vehicle.

BACKGROUND

It is known that an SCR system is an aftertreatment apparatus designed to reduce the nitrogen oxides ($NO_x$) emitted by the internal combustion engine. The SCR system includes a catalyst, which is disposed in an exhaust pipe of the engine to convert the nitrogen oxides into diatonic nitrogen and water with the aid of a reducing agent. The reducing agent may be injected in liquid state into the exhaust pipe by a dedicated injector that is disposed upstream of the catalyst. The injector receives the reducing agent from a tank by a pump which is in fluid communication with the injector via a supply conduit.

The SCR system may also include a pressure sensor for measuring the pressure of the reducing agent within the supply conduit and a number of electric heaters for heating the reducing agent in order to prevent it from freezing under cold environmental conditions.

The SCR system is associated to an electronic control unit (ECU), which is disposed aboard the motor vehicle to carry out on-board diagnostics of the engine. With regard to the SCR system, the ECU is usually provided for testing the proper functioning of the pressure sensor, of the pump, of the injector, of the electric heaters and of the supply conduit. If one of these functionality tests identifies a malfunctioning of the related component, the ECU activates a warning procedure, which provides for signaling to the driver that the motor vehicle needs a maintenance service and which may also limit the engine performance.

Once the maintenance service has been carried out, the warning procedure is only deactivated when the ECU repeats the functionality test of the repaired component, thereby recognizing that the malfunctioning is no longer present. However, each functionality test is only performed under predetermined operating conditions of the internal combustion engine, on that the warning procedure may remain active for a relatively long time after the maintenance service, without providing any immediate evidences that the maintenance service has been successful.

SUMMARY

The present disclosure provides a comprehensive method of testing the proper functioning of an (SCR) system, which may be activated as a single procedure with just one command and which provides as outcome a complete overview of the functionality status of the SCR system. The method is able to deactivate at once any of the warning procedures that may have been activated. The method and system disclosed herein are provided in a simple and rather inexpensive solution.

An embodiment of the present disclosure provides a method of testing a proper functioning of a selective catalytic reduction system of an internal combustion engine. The selective catalytic reduction system includes a catalyst disposed in an exhaust pipe of the engine, an injector disposed in the exhaust pipe upstream of the catalyst for injecting a reducing agent, a pump for providing the reducing agent from a tank to the injector via a supply conduit and a pressure sensor for measuring a pressure within the supply conduit. The engine is operated at idle speed and a functionality check of the pressure sensor is executed. The engine is operated to increase an exhaust gas temperature in the exhaust pipe upstream of the catalyst and a functionality check of the pump is executed. Thereafter, a functionality check of the injector is executed once the exhaust gas temperature has reached a predetermined target value thereof. After the functionality check of the injector, a functionality check of the supply conduit is executed.

If each one of the functionality checks yields a positive result, the selective catalytic reduction system is identified as functioning properly. In this way, the instant method includes and coordinates the functionality checks of all the relevant components of the SCR system, thereby providing, within a relatively small time period, comprehensive information about the global functionality of the SCR system. On the other hand, if any of the functionality checks yields a negative result the selective catalytic reduction system is identified as malfunctioning. In this way, the method may be used before a maintenance service of the SCR system, in order to allow the repair technicians to understand where the malfunctioning lies, or after the maintenance service, in order to allow the repair technicians to realize if the maintenance service has been successfully performed. Moreover, since the method executes all the relevant functionality checks of the SCR system, it automatically deactivates any warning procedures that may have been activated before the maintenance service.

According to an aspect of the method, the functionality check of the pressure sensor may include opening the injector while keeping the pump inactive, thereby emptying the supply conduit, measuring with the pressure sensor a value of the pressure within the supply conduit, and yielding a positive result of the check, if the measured value of the pressure differs from an expected value thereof by a quantity that is equal or smaller than a predetermined threshold value. This aspect provides a reliable solution for testing if the measurements made by the pressure sensor are rational.

According to another aspect of the method, the functionality check of the pump may include activating the pump while keeping the injector closed, measuring with the pressure sensor a value of the pressure within the supply conduit, and yielding a positive result of the check, if the measured value of the pressure differs from an expected value thereof by a quantity that is equal or smaller than a predetermined threshold value. This aspect provides a reliable solution for identifying if the pump is actually able to supply the reductant agent with the necessary pressure.

According to another aspect of the method, the functionality check of the pump may also include determining a value of a rotational speed of an electric motor actuating the pump, yielding the positive result of the check, if the determined value of the rotational speed is larger than a predetermined threshold value thereof. This aspect provides a reliable solution for identifying if the electric actuator of the pump is able to actuate the pump.

According to another aspect of the method, the functionality check of the injector may include operating the injector to perform an injection of the reducing agent, measuring, during the injection, a current profile across an electrical actuator, of the injector, and yielding a positive result of the check, if the measured current profile has a predetermined shape. This aspect provides a reliable solution for identifying if the injector is stuck or is able to perform the injection.

According to another aspect of the method, the functionality check of the supply conduit may include operating the injector to perform an injection of the reducing agent, determining a value of a pressure drop within the supply conduit caused by the injection, and yielding a positive result of the check, if the determined value of the pressure drop is larger than a predetermined threshold value. This aspect provides a reliable solution for identifying if unexpected obstructions are present along the supply conduit.

An embodiment of the method may also execute a functionality check of at least one electric heater for heating the reducing agent, while operating the engine at idle speed. This embodiment improves the reliability of the method by taking into account also the reliability of the heater.

According to an aspect of this embodiment, the functionality check of the electric heater may include energizing the electric heater, measuring a value of a voltage applied to the heater, measuring a value of an electric current flowing through the heater, calculating a value of an electrical resistance of the heater as a function of the voltage value and the electric current value, and yielding a positive result of the check, if the measured value of the voltage is equal or larger than a predetermined threshold value thereof and if the calculated value of the electrical resistance differs from an expected value thereof by a quantity that is equal or smaller than a predetermined threshold value. This aspect provides a reliable solution for identifying if the heater is able to operate properly.

An embodiment of the method may also include decreasing an amount of reducing agent stored into the catalyst, after the functionality check of the supply conduit. This embodiment has the effect of ensuring that, at the end of the testing method, the level of reducing agent stored into catalyst is low, thereby guaranteeing a proper functioning of the SCR system when the engine is operated to move the motor vehicle out of the garage.

According to an aspect of this embodiment, the amount of reducing agent stored into the catalyst may be decreased by measuring a value of a nitrogen oxides concentration in the exhaust pipe upstream of the catalyst, measuring a value of the nitrogen oxides concentration in the exhaust pipe downstream of the catalyst, and operating the engine at idle speed while keeping the injector closed, if the measured value of the nitrogen oxides concentration upstream of the catalyst differs from the measured value of a nitrogen oxides concentration downstream of the catalyst by a quantity that is larger than a predetermined threshold value. This aspect provides a reliable solution for decreasing the amount of reducing agent stored into the catalyst in a controlled way.

The present disclosure may be embodied in the form of a computer program including a computer-code, when executed run on a computer, for performing the method described above, or in the form of a computer program product including a carrier on which the computer program is stored. The present disclosure may be embodied in the form of a control apparatus for an internal combustion engine, including an electronic control unit, a data carrier associated to the electronic control unit and the computer program stored in the data carrier. Another embodiment may provide an electromagnetic signal modulated to carry a sequence of data bits which represent the computer program.

Another embodiment of the present disclosure provides an apparatus for testing a proper functioning of a selective catalytic reduction system of an internal combustion engine having a catalyst disposed in an exhaust pipe of the engine, an injector disposed in the exhaust pipe upstream of the catalyst for injecting a reducing agent, a pump for providing the reducing agent from a tank to the injector via a supply conduit and a pressure sensor for measuring a pressure within the supply conduit. The apparatus is configured to operate the engine at idle speed and execute a functionality check of the pressure sensor. The apparatus is also configured to operate the engine to increase an exhaust gas temperature in the exhaust pipe upstream of the catalyst and execute a functionality check of the pump, execute a functionality check of the injector after the functionality check of the pump and once the exhaust gas temperature has reached a predetermined target value thereof. The apparatus is further configured to execute a functionality check of the supply conduit, after the functionality check of the injector. If all of the functionality checks yields a positive result, the apparatus is configured to identify that the selective catalytic reduction system is functioning properly. If any of the functionality checks yields a negative result, the apparatus may be configured to identify the selective catalytic reduction system as malfunctioning.

This embodiment achieve basically the same effects of the method above, in particular that of providing a comprehensive information about the global functionality of the SCR system.

According to an aspect for executing the functionality check of the pressure sensor, the apparatus may be configured to open the injector while keeping the pump inactive, thereby emptying the supply conduit, measure with the pressure sensor a value of the pressure within the supply conduit, and yield a positive result of the check, if the measured value of the pressure differs from an expected value thereof by a quantity that is equal or smaller than a predetermined threshold value. This aspect provides a reliable solution for testing if the measurements made by the pressure sensor are rational.

According to another aspect for executing the functionality check of the pump, the apparatus may be configured to activate the pump while keeping the injector closed, measure with the pressure sensor a value of the pressure within the supply conduit, and yield a positive result of the check, if the measured value of the pressure differs from an expected value thereof by a quantity that is equal or smaller than a predetermined threshold value. This aspect provides a reliable solution for identifying if the pump is actually able to supply the reductant agent with the necessary pressure.

According to another aspect for executing the functionality check of the pump, the apparatus may be configured to determine a value of a rotational speed of an electric motor actuating the pump, and yield the positive result of the check, if the determined value of the rotational speed is larger than a predetermined threshold value thereof. This aspect provides a reliable solution for identifying if the electric actuator of the pump is able to actuate the pump.

According to another aspect for executing the functionality check of the injector, the apparatus may be configured to operate the injector to perform an injection of the reducing agent, measure, during the injection, a current profile across an electrical actuator of the injector, and yield a positive result of the check, if the measured current profile has a predetermined shape. This aspect provides a reliable solution for identifying if the injector is stuck or is able to perform the injection.

According to another aspect for executing the functionality check of the supply conduit, the apparatus may be configured to operate the injector to perform an injection of the reducing agent, determine a value of a pressure drop within the supply conduit caused by the injection, and yield a positive result of the check, if the determined value of the pressure drop is larger than a predetermined threshold value. This aspect provides a reliable solution for identifying if unexpected obstructions are present along the supply conduit.

In an embodiment, the apparatus may be configured to execute a functionality check of at least one electric heater for heating the diesel exhaust fluid, while operating the engine at idle speed. This embodiment improves the reliability of the method by taking into account also the reliability of the heater.

According to an aspect for executing the functionality check of the electric heater, the apparatus may be configured to energize the electric heater, measure a value of a voltage applied to the heater, measure a value of an electric current flowing through the heater, calculate a value of an electrical resistance of the heater as a function of the voltage value and the electric current value, and yield a positive result of the check, if the measured value of the voltage is equal or larger than a predetermined threshold value thereof and if the calculated value of the electrical resistance differs from an expected value thereof by a quantity that is equal or smaller than a predetermined threshold value. This aspect provides a reliable solution for identifying if the heater is able to operate properly.

In another embodiment, the apparatus may be configured to decrease an amount of reducing agent stored into the catalyst, after the functionality check of the supply conduit. This embodiment has the effect of ensuring that, at the end of the testing method, the level of reducing agent stored into catalyst is low, thereby guaranteeing a proper functioning of the SCR system when the engine is operated to move the motor vehicle out of the garage.

According to an aspect for decreasing the amount of reducing agent stored into the catalyst, the apparatus may be configured to measure a value of a nitrogen oxides concentration in the exhaust pipe upstream of the catalyst, measure a value of the nitrogen oxides concentration in the exhaust pipe downstream of the catalyst, and operate the engine at idle speed while keeping the injector closed, if the measured value of the nitrogen oxides concentration upstream of the catalyst differs from the measured value of a nitrogen oxides concentration downstream of the catalyst by a quantity that is larger than a predetermined threshold value. This aspect provides a reliable solution for decreasing the amount of reducing agent stored into the catalyst in a controlled way.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
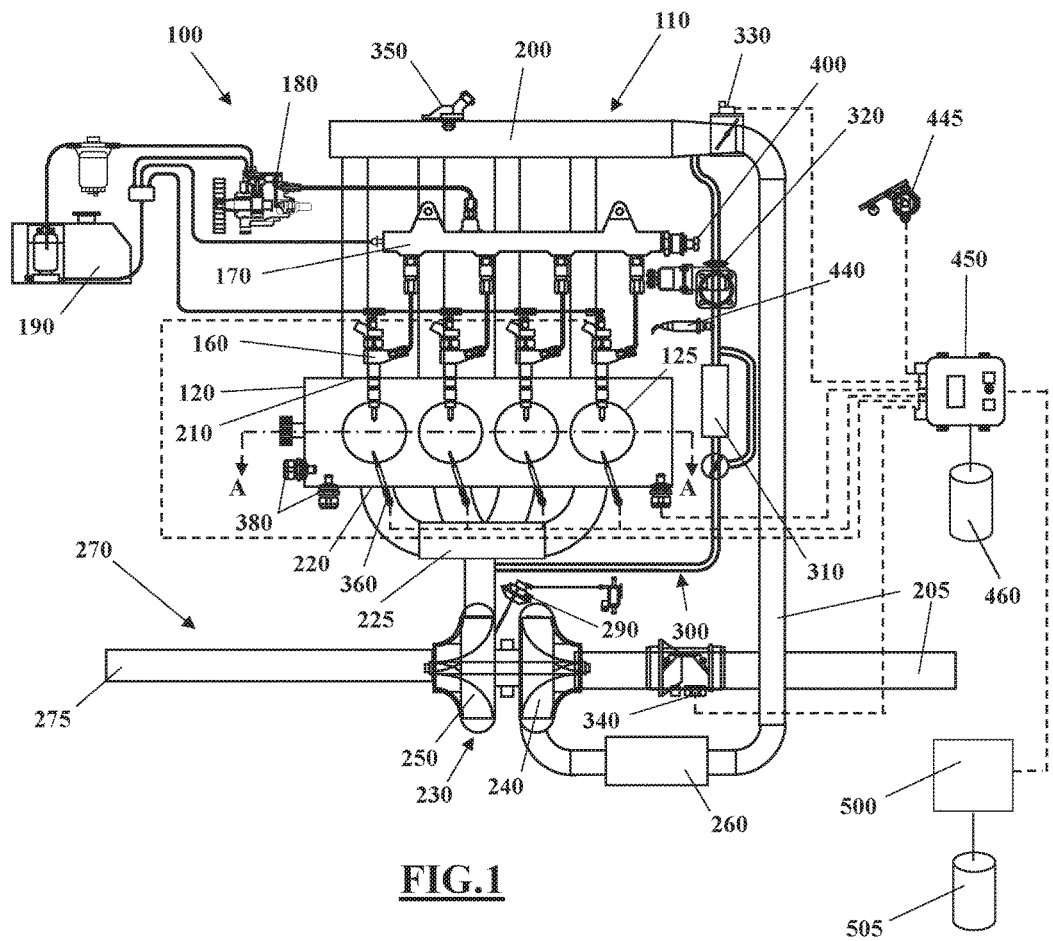
FIG. 1 shows an automotive system.
Figure 2:
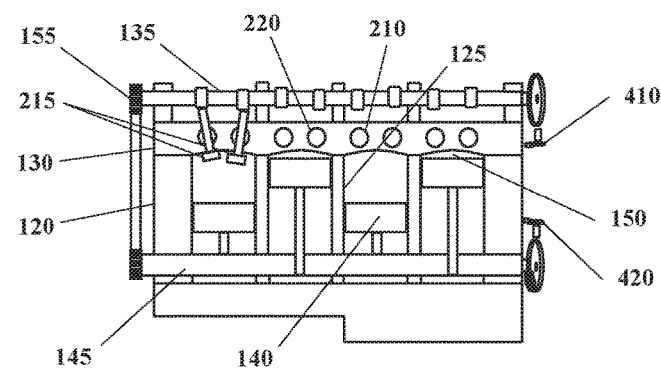
FIG. 2 is a cross-section of an internal combustion engine belonging to the automotive system shown in FIG. 1.

Some embodiments may include a motor vehicle (e.g. a passenger car) that embodies an automotive system 100, as shown in FIGS. 1 and 2. The automotive system 100 includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 255 arranged to move the vanes to alter the flow of the exhaust gases through the turbine 250. In other embodiments, the turbocharger 230 may be fixed geometry and/or include a waste gate.

Figure 3:
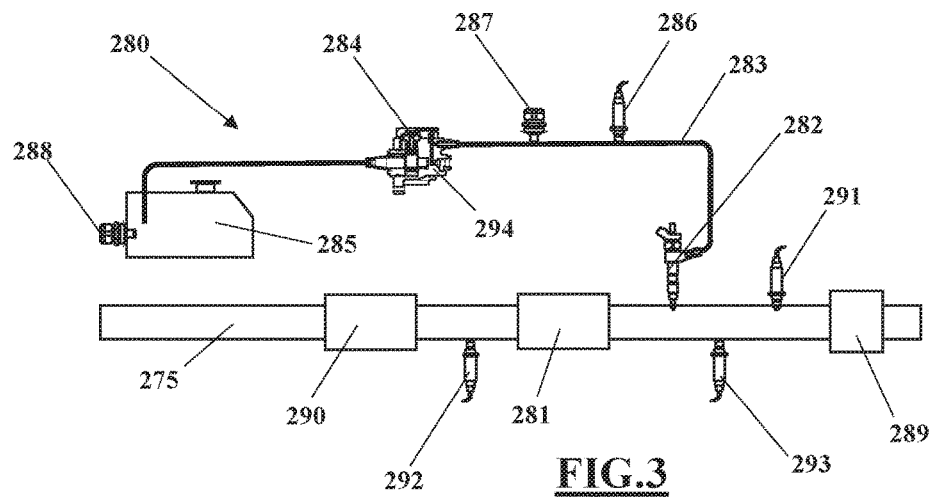
FIG. 3 is a schematic representation of an SCR system belonging to the automotive system shown in FIG. 1.

The exhaust gases exit the turbine 250 and are directed into an exhaust system 270. The exhaust system 270 may include an exhaust pipe 275 having one or more exhaust aftertreatment devices, as shown in FIG. 3. The aftertreatment devices may be any device configured to change the composition of the exhaust gases. In the present example, the aftertreatment devices include a selective catalytic reduction (SCR) system 280 that includes an SCR catalyst 281 (also referred as SCR converter) which is disposed in the exhaust pipe 275 for converting the nitrogen oxides contained in the exhaust gas into diatonic nitrogen and water. The conversion is operated with the aid of a liquid reducing agent (e.g. urea) which is injected into the exhaust pipe 275 upstream of the SCR catalyst 281. In this way, the reducing agent, also referred as diesel exhaust fluid (DEF), mixes with the exhaust gas and vaporizes, before being absorbed and stored into the SCR catalyst 281. The reducing agent is injected in the exhaust pipe 275 by a DEF injector 282, which is disposed upstream of the SCR catalyst 281. The reducing agent is provided to the DEF injector 282 from a supply conduit 283, which is in fluid communication with a DEF pump 284 that increases the pressure of the reducing agent received from a DEF tank 285. The DEF pump 285 may be actuated by an electric motor 294. The SCR system 280 may also include a DEF pressure sensor 286 disposed in the supply conduit 283 for measuring the pressure of the reducing agent therein, and a number of electric heaters for heating the reducing agent and thus prevent the reducing agent from freezing under cold environmental conditions. In particular, the heaters may include a heater 287 disposed in the supply conduit 283 and a heater 288 disposed in the DEF tank 285. The aftertreatment devices may further include an oxidation catalysts 289 disposed in the exhaust pipe 275 upstream of the DEF injector 282, and a particulate filters 290 disposed in the exhaust piper 275 downstream of the SCR catalyst 281. Other embodiments may further include an exhaust gas recirculation (EGR) system 300, as shown in FIG. 1, coupled between the exhaust manifold 225 and the intake manifold 200. The EGR system 300 may include an EGR cooler 310 to reduce the temperature of the exhaust gases in the EGR system 300 and an EGR valve 320 to regulate a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, hut are not limited to, the DEF pressure sensor 286, a NOx sensor 291 disposed in the exhaust pipe 275 between the oxidation catalyst 289 and the SCR catalyst 281, a NOx sensor 292 disposed in the exhaust pipe 275 between the SCR catalyst 281 and the particulate filter 290, an exhaust gas temperature sensor 293 disposed in the exhaust pipe 275 between the oxidation catalyst 289 and the SCR catalyst 281, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the DEF injector 282, the heaters 287 and 288, the electric motor 294 of the DEF pump 284, the throttle body 330, the EGR Valve 320, the VGT actuator 255, and the cam phaser 155. Note, dashed lines are used to indicate communication between the ECU 450 and the various sensors and devices, hut some are omitted for clarity.

Turning now to the ECU 450, this apparatus may include a digital central processing unit (CPU) in communication with a memory system 460 and an interface bus. The CPU is configured to execute instructions stored as a program in the memory system 460, and send and receive signals to/from the interface bus. The interface bus may be configured to send, receive, and modulate analog and/or digital signals to/from the various sensors and control devices. The memory system 460 may include various storage types including optical storage, magnetic storage, solid state storage, and other non-volatile memory. The program stored in the memory system 460 is transmitted from outside via a cable or in a wireless fashion. Outside the automotive system 100, the program is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop. In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

The ECU 450, or any other substitutive type of processor deployed in the vehicle, may be set in communication, via cable or in wireless fashion, with an electronic device 500, usually referred as scan tool, which is not part of the automotive system 100 and which may be provided to authorized repair technicians for performing diagnostics of the automotive system 100. The electronic device 505 may receive input signals from a user interface (e.g. a keyboard), send and receive signals to/from the ECU 450, and display data and/or other information on a visualizer (e.g. a display). To do so, the electronic device 500 may include a digital central processing unit (CPU) in communication with a memory system 505 and an interface bus. The CPU is configured to execute instructions stored as a program in the memory system 505, and send and receive signals to/from the interface bus. The interface bus may be configured to send, receive, and modulate analog and/or digital signals to/from the ECU 450. The memory system 505 may include various storage types including optical storage, magnetic storage, solid state storage, and other non-volatile memory. The program stored in the memory system 505 is transmitted from outside via a cable or in a wireless fashion. Outside the electronic device 500, the program is normally visible as a computer program product, which should be understood to be a computer program code residing on a carrier, the carrier being transitory or non-transitory in nature with the consequence that the computer program product can be regarded to be transitory or non-transitory in nature, as explained above.

The program stored in the memory system 505 of the electronic device 500 may cooperate with the program stored in the memory system 460 of the ECU 450 to embody the methods that will be disclosed hereafter, allowing the respective CPUs to carryout out the steps of such methods. In other words, some of the steps may be performed by the CPU of the electronic device 500, some other steps may be performed by the CPU of the ECU 450, and some other steps may be performed by the CPU of the ECU 450 under instruction of the CPU of the electronic device 500.

The method here concerned is a method of testing the proper functioning of the SCR system 280, which is intended to be executed in the context of a maintenance service of the motor vehicle, for example a maintenance service caused by the activation of a warning procedure related to the SCR system 280. While the motor vehicle is standing still in a predetermined place, for example in a garage, a repair technician may connect the external electronic device 500 to the ECU 450 and start the testing method. The electronic device 500 may be configured to start the method upon the reception of a single command that the technician may deliver through the user interface.

Figure 4:
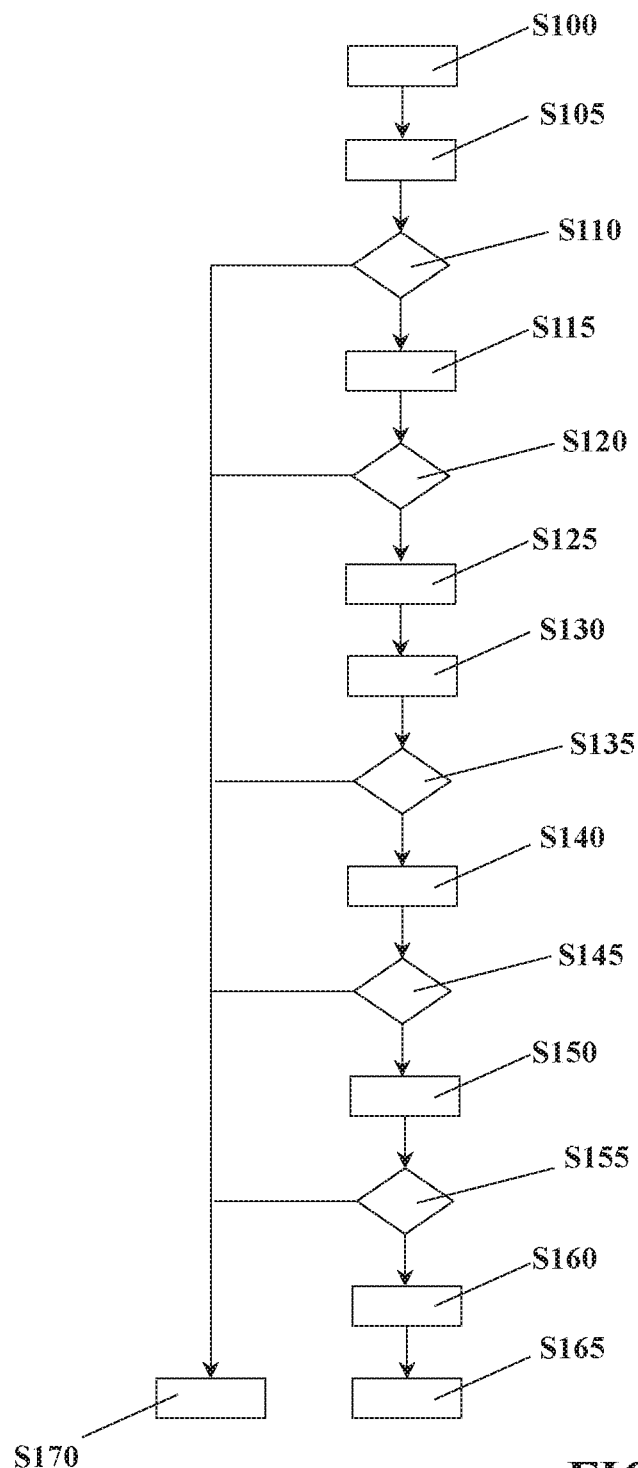
FIG. 4 is a flowchart of a method for testing the proper functioning of the SCR system of FIG. 3.

Referring to the flowchart of FIG. 4, once the starting command has been received, the electronic device 500 may command the ECU 450 to operate the engine at idle speed (block S100). Idle speed is the rotational speed of the crankshaft 145 (generally measured in revolutions per minute or rpm) that the ICE 110 generates when the ICE 110 is uncoupled to the drivetrain and the accelerator pedal is not depressed. At idle speed, the ICE 110 generates enough power to run reasonably smoothly and to operate its ancillaries (water pump, alternator and other accessories), but usually not enough to move the motor vehicle. For a passenger-car, idle speed is customarily between 600 rpm and 1100 rpm. In order to operate the ICE 110 at idle speed, the ECU 450 may be configured to carry out a closed-loop control logic of the engine speed, which includes the steps of measuring the rotational speed of the crankshaft 145, for example by the crank position sensor 420, and then of regulating the quantity of fuel that is injected into the combustion chambers 150 to minimize a difference between the measured speed and the idle speed.

While the motor vehicle is standing still and the ICE 110 is operating at idle speed, the electronic device 500 may command the ECU 450 to execute a functionality check of the DEF pressure sensor 286 (block S105). As a first step, the functionality check of the DEF pressure sensor 286 may provide for the ECU 450 to open the DEF injector 282 while keeping the DEF pump 284 inactive. In this way, the reducing agent that may be still present in the supply conduit 283 is released into the exhaust pipe 275, thereby reducing the pressure inside the supply conduit 283. When the supply conduit 283 is empty or almost empty, the ECU 450 may be configured to automatically start a process for monitoring the rationality of the DEF pressure sensor 286. This process may include the steps of measuring with the DEF pressure sensor 286 a value of the pressure within the supply conduit 283 and to compare the measured value with an expected value thereof. The expected value of the supply conduit pressure may be a calibration value that, considering that the supply conduit should be empty, may correspond to the value of the atmospheric pressure. If the difference between the measured value and the expected value of the supply conduit pressure is equal or smaller than a predetermined threshold value (which may be a calibration value too), it means that the DEF pressure sensor 286 is working properly and the functionality check may yield a positive result. On the contrary, if the difference is larger than the predetermined threshold value, it means that the DEF pressure sensor 286 is faulty and the functionality check may yield a negative result. If the functionality check of the DEF pressure sensor 286 yields a negative result (block S110), the electronic device 500 may abort (i.e. immediately end) the testing method and visualize on the display a test status message reporting the fault of the DEF pressure sensor 286 (block S170).

Figure 5:
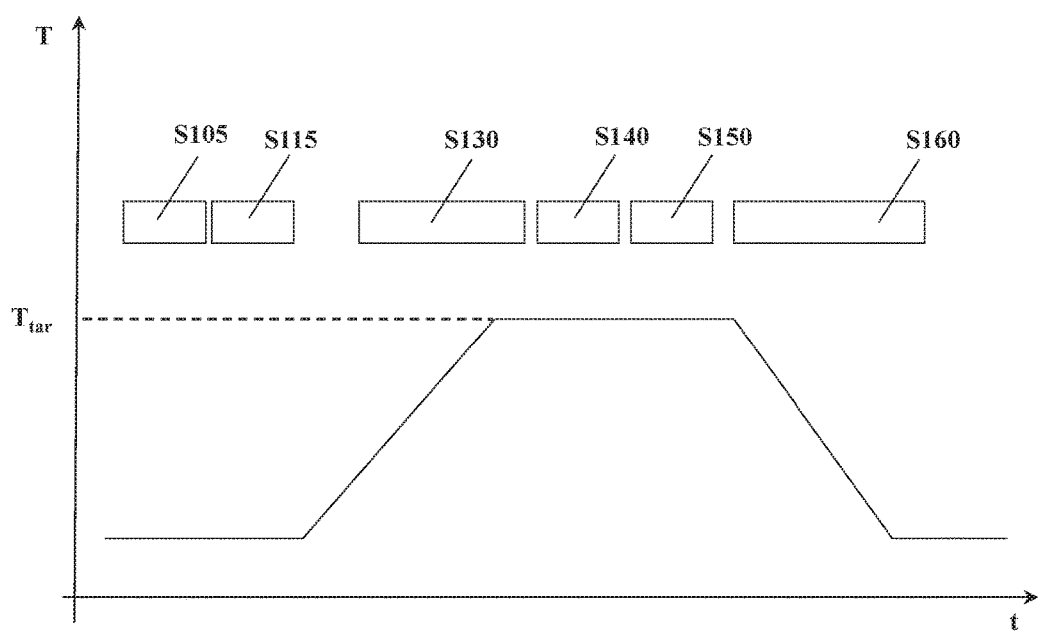
FIG. 5 is a graph that shows the variation of the exhaust gas temperature [T] and the steps of the testing method steps over time [t].

If the functionality check of the DEF pressure sensor 286 yields a positive result, the ECU 450 may be configured to automatically deactivate any warning procedures related to the DEF pressure sensor 286, whereupon the electronic device 500 may command the ECU 450 to execute a functionality check of each one of the electric heaters 287 and 288 (block S115). The functionality check of the heaters 287 and 288 may be executed while the ICE 110 is still operating at idle speed, as shown in FIG. 5. The functionality check of the heaters 287 and 88 essentially provides for the electronic device 500 to activate the heaters by commanding the ECU 450 to energize them. Upon energization, the ECU 450 may automatically identify if the electric heaters 287 and 288 are actually present (i.e. connected to the electric circuit) and/or if their energization causes any short-circuits. If the heaters are present and no short-circuits are identified, the functionality check of each one of the heaters 287 and 288 may provide for the ECU 450 to measure a value of a voltage applied to the heater and a value of an electric current flowing through the heater, and to calculate a value of an electrical resistance of the heater as a function of the voltage value and the electric current value. The measured voltage value may be compared to a threshold value thereof, which represents a minim voltage value that must be supplied to the heater for efficiently heat the reducing agent. This threshold value of the voltage may be a calibration value determined on the basis of the voltage of the battery of the vehicle. On the other side, the calculated resistance value may be compared to an expected value thereof, which may be a nominal value of the heater resistance as provided by the data sheets of the supplier. If the measured value of the voltage is equal or larger than the aforesaid threshold value and if the calculated value of the electrical resistance differs from the expected value thereof by a quantity that is equal or smaller than a predetermined threshold value (which may be a calibration value too), it means that the heater is working and the functionality check may yield a positive result. On the contrary, if the measured value of the voltage is smaller than the related threshold value or if the calculated value of the electrical resistance differs from the expected value thereof by a quantity that is larger than a predetermined threshold value, it means that the heater is faulty and the functionality check may yield a negative result. If the functionality check yields a negative result (block S120), the electronic device 500 may abort the testing method and visualize on the display a test status message reporting the fault of the heaters 287 and/or 288 (block S170).

If the functionality check of the heaters 287 and 288 yields a positive result, the ECU 450 may be configured to automatically deactivate any warning procedures related to the heaters, whereupon the electronic device 500 may command the ECU 450 to operate the ICE 110 in such a way to warm up the SCR system 280, thereby increasing the temperature of the exhaust gasses that flow in the exhaust pipe 275 upstream of the SCR catalyst 281 (block S125). To do so, the ECU 450 may be configured to increase the rotational speed of the cranks aft 145 up to a set-point value that is larger than the idle speed value. By way of example, the ECU 450 may carry out the closed-loop control logic of the engine speed described above, but using the new setpoint value of the engine speed instead of the idle speed. At the same time, the ECU 450 may be configured to inject the fuel into the combustion chambers 150 according to a warm up combustion mode. By way of example, the warm up combustion mode may provide for the ECU 450 to perform so-called after injections, which are small quantities of fuel that are injected into the combustion chamber 150 during the expansion stroke of the piston 140, shortly before the opening of the exhaust port 220. These fuel quantities produce a negligible torque at the crankshaft 145 but they burn inside the cylinder 125, thereby increasing the temperature of the exhaust gas. While the ICE 110 is operating this way, the ECU 450 may be configured to measure the temperature of the exhaust gas upstream of the SCR catalyst 281, for example by the exhaust gas temperature sensor 293. When the measured temperature of the exhaust gas upstream of the SCR catalyst 281 reaches a predetermined target value thereof indicated as $T_{tar}$ in FIG. 5, the electronic device 500 may command the ECU 450 to change combustion mode and to operate the ICE 110 in such a way to keep constant the exhaust gas temperature at the target value $T_{tar}$. To do so, the ECU 450 may be configured to carry out a closed-loop control logic of the exhaust gas temperature upstream of the SCR catalyst 281, which may include the steps of measuring the exhaust gas temperature upstream of the SCR catalyst 281, and then of regulating the quantity of fuel that is injected into the ICE 110 (for example by the after-injections) in order to minimize a difference between the measured value and the target value $T_{tar}$ of the temperature. The target value $T_{tar}$ of the exhaust gas temperature upstream of the SCR catalyst 281 may be a calibration parameter that is generally determined to be larger than a dew point temperature of the exhaust gas upstream of the SCR catalyst 281, for example it may be around 300° C.

While the temperature of the exhaust gas temperature upstream of the SCR catalyst 281 is increasing, the electronic device 500 may command the ECU 450 to start a functionality check of the DEF pump 284 (block S130). This functionality check may start before the temperature of the exhaust gas upstream of the SCR catalyst 281 has reached the target value $T_{tar}$, and may be completed after. As a first step, the functionality check of the OFT pump 284 may provide for the ECU 450 to activate the DEF pump 284, by way of example by energizing the electric motor 294, while keeping the DEF injector 28 closed. In this way, the reducing agent should be delivered into the supply conduit 283, thereby increasing its internal pressure. Upon activation of the DEF pump 284, the ECU 450 may automatically identify if the energization of the electric motor 294 causes any short-circuits. If no short-circuits are identified, the functionality check of the DEF pump 284 may provide for the ECU 450 to determine a value of a rotational speed of the electric motor 294 and to compare it with a predetermined threshold value thereof. The rotational speed of the electric motor 294 may be measured with a dedicated sensor or estimated as a function of the electrical current that flows through the various phases of the motor. The threshold value of the rotational speed may be a calibration value, which is usually chosen very small. If the measured value of the rotational speed is smaller than the related threshold value, it means that the DEF pump 284 is faulty and the functionality check may yield a negative result. On the contrary, if the measured value of the rotational speed is larger than the threshold value, it means that the DEE pump 284 is able to operate. In this case, the functionality check of the DEF pump 284 may further provide for the ECU 450 to measure with the DEF pressure sensor 286 (which has been already tested) a value of the pressure within the supply conduit 283 and to compare the measured value with an expected value of the supply conduit pressure due to the activation of the DEF pump 284. This expected value may be a calibration parameter determined on the basis of the geometry of the supply conduit 283 and of the operating parameters of the DEF pump 284 (e.g. its speed, displacement and operating time). If the difference between the measured value and the expected value of the supply conduit pressure is equal or smaller than a predetermined threshold value (which may be a calibration value too), it means that the DEF pump 284 is working properly and the functionality check may yield a positive result. On the contrary, if the difference is larger than the predetermined threshold value, it means that the DEF pump 284 is faulty and the functionality check may yield a negative result. Also in this case, if the functionality check yields a negative result (block S135), the electronic device 500 may abort the testing method and visualize on the display a test status message reporting the fault of the DEF pump 284 (block S170).

If the functionality check of the DEF pump 284 yields a positive result, the ECU 450 may be configured to automatically deactivate any warning procedures related to the DEF pump 284, whereupon the electronic device 500 may command the ECU 450 to execute a functionality check of the DEF injector 282 (block S140). This functionality check may be executed provided that the temperature of the exhaust gas upstream of the DEF catalyst 281 (as measured by the temperature sensor 293) has already reached the target value $T_{tar}$, as shown in FIG. 5. The functionality check of the DEF injector 282 may prescribe that the 450 operates the DEF injector 282 to perform an injection of reducing agent. The injection may be performed by supplying an electrical current to an electrical actuator of the DEE injector 282, to which the electrical actuator should respond by opening an injector nozzle, thereby allowing a certain amount of reducing agent to flow from the supply conduit 283 into the exhaust pipe 275. The duration of the injection may be predetermined so that the amount of injected reducing agent is reasonably small. The functionality check may further provide for the ECU 450 to measure, during the injection, the current profile across the electrical actuator of the DEF injector 282 (i.e. how the electrical current flowing through the actuator varies over time), and to compare the measured current profile with an expected (e.g. ideal) current profile determined during a calibration activity. If the shape of the measured current profile corresponds to the shape of the expected current profile, in particular if the shape of the measured current profile includes a characteristic step variation, it means that the DEF injector 282 is working properly and the functionality check may yield a positive result. On the contrary, if the shape of the measured current profile does not correspond to the shape of the expected current profile, in particular if the shape of the measured current profile does not include the aforementioned characteristic step variation, it means that the DEF injector 282 is stuck and the functionality check may yield a negative result. If the functionality check yields a negative result (block S145), the electronic device 500 may abort (i.e. immediately end) the testing method and visualize on the display a test status message reporting the fault of the DEF injector 282 (block S170).

If the functionality check of the DEF injector 282 yields a positive result, the ECU 450 may be configured to automatically deactivate any warning procedures related to the DEF injector 282, whereupon the electronic device 500 may command the ECU 450 to execute a functionality check of the supply conduit 283 (block S150). This functionality check may be executed while the temperature of the exhaust gas upstream of the DEF catalyst 281 (as measured by the temperature sensor 293) is still at the target value $T_{tar}$, as shown in FIG. 5.

In some embodiments, the ECU 450 may be configured to automatically execute the functionality check of the supply conduit 283 when the overall amount of reducing agent injected into the exhaust pipe 275 exceeds a predetermine threshold value thereof. In other words, the ECU 450 may be configured to progressively integrate over time the quantities of the reducing agent that are injected into the exhaust pipe 275, thereby calculating and progressively updating the overall amount thereof, and to start the functionality check of the supply conduit 283 when the calculated overall amount of reducing agent exceeds the predetermine threshold value. In these cases, the electronic device 500 may thus command the functionality check of the supply conduit 283, by forcing the ECU 450, after the functionality check of the DEF injector 282, to perform a plurality of injections until the calculated overall amount of reducing agent exceeds the predetermine threshold value.

Turning now to the functionality check of the supply conduit 283, this check may prescribe that the ECU 450 operates the DEF injector 282 to perform an additional injection of reducing agent. The duration of this additional injection may be predetermined so that the amount of injected reducing agent is larger than the amount of reducing agent that was injected during the functionality check of the DEF injector 282. The functionality check may further provide for the ECU 450 to determine a value of the pressure drop caused, within the supply conduit 283, by the additional injection and to compare the determined value of the pressure drop with a threshold value thereof. The value of the pressure drop may be determined by measuring, for example with the DEF pressure sensor 286, the pressure values in the supply conduit 283 before and after the additional injection, and then by calculating the difference between these two measured values. On the other side, the threshold value of the pressure drop may be a calibration value that is determined as a function of the duration of the additional injection and the geometry of the supply conduit 283. If the determined value of the pressure drop is larger than the predetermined threshold value, it means that the supply conduit 283 is working properly and the functionality check may yield a positive result. On the contrary, if the determined value of the pressure drop is smaller than the predetermined threshold value, it means that the supply conduit 283 is clogged or obstructed and the functionality check may yield a negative result. If the functionality check yields a negative result (block S155), the electronic device 500 may abort (i.e. immediately end) the testing method and visualize on the display a test status message reporting the fault of the supply conduit 283.

If the functionality check of the supply conduit 283 yields a positive result, the ECU 450 may be configured to automatically deactivate any warning procedures related to the supply conduit 283, whereupon the electronic device 500 may command the ECU 450 to execute a cleaning phase of the SCR catalyst 281 from the reducing agent stored therein (block S160). To do so, the ECU 450 may operate the ICE 110 at idle speed again, thereby reducing both the engine speed and the temperature of the exhaust gas, as shown in FIG. 5, while keeping the DEF injector 286 always closed. In this way, the reducing agent, which was stored into the SCR catalyst 281 while performing the functionality checks, is progressively consumed for converting the nitrogen oxides (NOx) contained in the exhaust gas, so that the amount of reducing agent stored in the SCR catalyst 291 decreases. While performing this cleaning phase, the electronic device 500 may be configured to measure a value of a NOx concentration in the exhaust pipe 275 upstream of the SCR catalyst 281, for example by the NOx sensor 291, and a value of a NOx concentration in the exhaust pipe 275 downstream of the SCR catalyst 281, for example by the NOx sensor 292, and to calculate the difference between these two measured values. If the difference exceeds a predetermined threshold value (e.g. a calibration parameter), it means that too much reducing agent is still contained in the SCR catalyst 281 and the cleaning phase goes on. If conversely the difference is equal or smaller than the threshold value, it means that the SCR catalyst is empty or almost empty and the cleaning phase may thus be terminated. By way of example, the cleaning phase may be terminated by turning the ICE 110 off.

Once the cleaning phase has been terminated and all the functionality checks have yielded a positive result, the electronic device 500 may finally identify that the SCR system is functioning properly (block S165) and display a test status message reporting this information.

Some embodiments may prescribe that each one of the above-described functionality checks should be completed within a predetermined time limit. At the expiry of the time limit, if the functionality check has not been able to yield any results, the electronic device 500 may abort the test method or move to the next functionality check of the sequence. In any case, the electronic device 500 may be configured to displaying a test status message reporting the failure of the functionality check that was not completed. Other embodiments may prescribe that the entire test method should be completed within a predetermined time limit. At the expiry of this time limit, if the test method has not been able to yield any final results, the electronic device 500 may abort the test method and display a test status message reporting that the testing method has failed.

It should be additionally observed that, while the testing method is underway, the ECU 450 may be configured to automatically carry out other diagnostics related to the SCR system 280, such as for example an electrical compliance test of a temperature sensor for measuring the temperature of the reducing agent within the DEF tank 285, an electrical compliance test of the DEF pressure sensor 286, an electrical compliance test of a level sensor for measuring the level of the reducing agent within the DEF tank 285, and an electrical compliance test of several relays and other electrical connections. Once the temperature of the exhaust gas upstream of the SCR catalyst 281 exceeds a predetermined dew point temperature, the ECU 450 may be further configured to carry out an electrical compliance test and/or a functionality check of the NOx sensors 291 and 292. According to some embodiments, the testing method may thus provide for the electronic device 500 to wait for the results of all these additional diagnostics and then to identify that the SCR system 280 is functioning properly, provided that no one of these additional checks recognize a fault of the related component.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of testing the functioning of a selective catalytic reduction system of an internal combustion engine having a catalyst disposed in an exhaust pipe of the engine, an injector disposed in the exhaust pipe upstream of the catalyst for injecting a reducing agent, a pump for providing the reducing agent from a tank to the injector via a supply conduit, a pressure sensor for measuring a pressure within the supply conduit, and an electronic control unit having processor stored executable instructions to perform the method which comprises:
 operating the engine at idle speed;
 executing a functionality check of the pressure sensor while operating the engine at idle speed;
 operating the engine to increase an exhaust gas temperature in the exhaust pipe upstream of the catalyst;
 executing a functionality check of the pump;
 executing a functionality check of the injector, after the functionality check of the pump and once the exhaust gas temperature has reached a predetermined target value thereof;
 executing a functionality check of the supply conduit after the functionality check of the injector; and
 executing a cleaning phase of the catalyst from the reducing agent stored in the catalyst of the selective catalytic reduction system closing the injector when the functionality checks of the pressure sensor, the pump, the injector and the supply conduit yield a positive result.

2. The method according to claim 1, wherein the functionality check of the pressure sensor comprises:
 opening the injector pile keeping the pump inactive to empty the supply conduit;
 measuring a value of the pressure within the supply conduit with the pressure sensor; and
 yielding a positive result of the check when the measured value of the pressure differs from an expected value by a quantity that is less than or equal to a predetermined threshold value.

3. The method according to claim 1, wherein the functionality check of the pump comprises:
 activating the pump while keeping the injector closed;
 measuring a value of the pressure within the supply conduit with a pressure sensor; and
 yielding a positive result of the check when the measured value of the pressure differs from an expected value by a quantity that is less than or equal to a predetermined threshold value.

4. The method according to claim 3, wherein the functionality check of the pump further comprises:
 determining a value of a rotational speed of an electric motor actuating the pump; and
 yielding the positive result of the check when the determined value of the rotational speed is greater than a predetermined threshold value.

5. The method according to claim 1, wherein the functionality check of the injector comprises:
 operating the injector to perform an injection of the reducing agent;
 measuring a current profile across an electrical actuator of the injector during the injection; and
 yielding a positive result of the check when the measured current profile has a predetermined shape.

6. The method according to claim 1, wherein the functionality check of the supply conduit comprises:
 operating the injector to perform an injection of the reducing agent;
 determining a value of a pressure drop within the supply conduit caused by the injection; and
 yielding a positive result of the check when the determined value of the pressure drop is greater than a predetermined threshold value.

7. The method according to claim 1, the electronic control unit having processor stored executable instructions to further perform the method comprising executing a functionality check of an electric heater for heating the diesel exhaust fluid while operating the engine at idle speed.

8. The method according to claim 7, wherein the functionality check of the electric heater comprises:
 energizing the electric heater;
 measuring a value of a voltage applied to the heater;
 measuring a value of an electric current flowing through the heater;
 calculating a value of an electrical resistance of the heater as a function of the voltage value and the electric current value; and
 yielding a positive result of the check when (i) the measured value of the voltage is greater than or equal to a first predetermined threshold value and (ii) the calculated value of the electrical resistance differs from an expected value by a quantity that is less than or equal to a second predetermined threshold value.

9. The method according to claim 1, further comprising decreasing an amount of reducing agent stored into the catalyst after the functionality check of the supply conduit.

10. The method according to claim 9, wherein decreasing the amount of reducing agent stored into the catalyst comprises:
 measuring a value of a nitrogen oxides concentration in the exhaust pipe upstream of the catalyst;
 measuring a value of the nitrogen oxides concentration in the exhaust pipe downstream of the catalyst; and
 operating the engine at idle speed while keeping the injector closed, when the measured value of the nitrogen oxides concentration upstream of the catalyst differs from the measured value of a nitrogen oxides concentration downstream of the catalyst by a quantity that is greater than a predetermined threshold value.

11. A computer program comprising a non-transitory computer readable medium having a computer-code, when executed run on a computer, is configured to:
 operate an engine at an idle speed;
 execute a functionality check of a pressure sensor, while operating the engine at idle speed;
 operate the engine to increase an exhaust gas temperature in an exhaust pipe upstream of a catalyst;
 execute a functionality check of a pump;
 execute a functionality check of an injector after the functionality check of the pump and once the exhaust gas temperature has reached a predetermined target value thereof;
 execute a functionality check of a supply conduit after the functionality check of the injector; and execute a cleaning phase of the catalyst from the reducing agent stored in the catalyst of a selective catalytic reduction system by closing the injector when the functionality checks of the pressure sensor, the pump, the injector and the supply conduit yield a positive result.

* * * * *